United States Patent [19]

Scheuble et al.

[11] Patent Number: 5,308,535
[45] Date of Patent: May 3, 1994

[54] ELECTRO-OPTICAL SYSTEM CONTAINING A COMPENSATING FILM

[75] Inventors: Bernhard Scheuble, Seeheim-Jugenheim; Bernhard Rieger, Münster-Altheim; Dieter Dorsch, Ober-Ramstadt, all of Fed. Rep. of Germany

[73] Assignee: Merck Patent Gesellschaft mit beschrankter Haftung, Darmstadt, Fed. Rep. of Germany

[21] Appl. No.: 573,003

[22] PCT Filed: Jun. 8, 1990

[86] PCT No.: PCT/EP90/00897

§ 371 Date: Aug. 27, 1990

§ 102(e) Date: Aug. 27, 1990

[87] PCT Pub. No.: WO90/16005

PCT Pub. Date: Dec. 27, 1990

[30] Foreign Application Priority Data

Jun. 14, 1989 [DE] Fed. Rep. of Germany ....... 3919397
Aug. 1, 1989 [DE] Fed. Rep. of Germany ....... 3925382

[51] Int. Cl.$^5$ .................... C09K 19/52; C09K 19/12; G02F 1/13
[52] U.S. Cl. .................... 252/299.01; 252/299.66; 359/93; 359/106; 359/73; 359/94; 359/96; 428/1
[58] Field of Search ...................... 252/299.01, 299.66; 359/93, 106, 73, 94, 96; 428/1

[56] References Cited

U.S. PATENT DOCUMENTS

| 4,443,065 | 4/1984 | Funada et al. | 359/53 X |
| 4,702,558 | 11/1987 | Coles et al. | 350/330 |
| 4,844,569 | 7/1989 | Wada et al. | 359/73 X |
| 4,904,066 | 2/1990 | Gray et al. | 359/104 |
| 4,995,705 | 2/1991 | Yoshinaga et al. | 359/104 |
| 5,119,216 | 6/1992 | Wada et al. | 359/53 X |

FOREIGN PATENT DOCUMENTS

| 0239433 | 9/1987 | European Pat. Off. |
| 0320283 | 6/1989 | European Pat. Off. |
| 0271232 | 11/1988 | Japan |
| 0079724 | 3/1989 | Japan |
| 1206318 | 8/1989 | Japan |

OTHER PUBLICATIONS

Matthias Ballauff, "Flüssig-kristalline Polymere," Chemie in unserer Zeit, Jan. 22, 1988, Nr. 2, pp. 63–68.

*Primary Examiner*—Robert L. Stoll
*Assistant Examiner*—C. Harris
*Attorney, Agent, or Firm*—Millen, White, Zelano, & Branigan

[57] ABSTRACT

The invention relates to electro-optical systems containing an addressable liquid-crystal layer and a device for compensating for the optical path difference d·Δn of the addressable liquid-crystal layers, the compensating device being based on a liquid-crystalline polymer.

27 Claims, No Drawings

ELECTRO-OPTICAL SYSTEM CONTAINING A COMPENSATING FILM

SUMMARY OF THE INVENTION

The invention relates to an electro-optical system containing at least one addressable liquid-crystal layer and a device for compensating for the optical path difference d·Δn of the addressable liquid-crystal layers.

Compensating for the optical path difference d·Δn of optically uniaxial media is based on a well-known physical principle which is implemented, for example, in the Babinet-Soleil compensator. A second optically uniaxial medium which has the same optical path difference d·Δn is added to the optically uniaxial medium, the optical axes of the two media being, however, perpendicular to each other. Linearly polarized light whose plane of polarization is inclined at 45° to the optical axis of the first medium is split up into an ordinary and an extraordinary ray. Since the optical axes of the two media are perpendicular to each other, the ordinary ray of the first medium passes through the second medium as an extraordinary ray and vice versa. The optical path difference in the first medium is $d \cdot (n_e - n_o)$ and in the second medium, on the other hand, $d \cdot (n_o - n_e)$, with the result that the total path difference is zero and the system composed of the two optically uniaxial media does not exhibit birefringence.

This principle, which is also known as delay compensation, was first proposed in 1981 for TN-displays (U.S. Pat. No. 4,443,065). In that case, a second TN display was used as compensating medium to eliminate the undesirable interference colors. It is also possible to compensate for the interference colors of STN displays by adding a second STN display having an opposite helical direction of rotation but otherwise identical properties (K. Katoh, Y. Endo, M. Akatsuka, M. Ohgawara and K. Sawada, Jap. J. Appl. Phys. 26 (1987) L 1784; SID Digest Vol. 20, 1989, papers 22.3, 22.4, 22.5 and 22.6). In the case of ECB displays, a combination of two ECB cells is used, the liquid-crystal molecules in the two cells having the same pre-tilt and having the same angle with respect to the homeotropic direction in the switched state, but the direction of rotation of said angle being opposite. Furthermore, the use of a planarly oriented, optically negative discotic liquid-crystal layer has been proposed (DE 39 11 620) for ECB displays.

The use of a second, not necessarily addressable liquid-crystal layer as compensating medium in electro-optical systems is advantageous, on the one hand, since the liquid-crystal layer used for displaying information or for compensation has an identical temperature dependence of the birefringence, and this makes compensation possible in a wide temperature range. In addition, both liquid-crystal layers exhibit a substantially identical dispersion, i.e., a substantially identical wavelength dependence of the birefringence. On the other hand, however, the use of two or more liquid-crystal layers results in increased production costs, a reduced output in production and a markedly higher display weight.

Because of these disadvantages, organic compensating films based on polycarbonate, polyvinyl alcohol or polyethylene terephthalate have been developed. Compared with two-layer or multilayer displays, however, electro-optical systems provided with such compensating films have a reduced contrast, a higher dependence of the contrast on viewing angle and a markedly smaller working temperature range. Owing to the difference in dispersion between compensating film and LCD, color displays require more than one compensating film. Furthermore, the production of organic compensating films is fairly complicated and requires a precise two-dimensional stretching of the organic polymeric material to achieve the optically uniaxial characteristic.

There is consequently still an appreciable need for electro-optical systems which contain a device for compensating for the optical path difference d·Δn, in which said device does not have the disadvantages of the compensating media hitherto achieved but, as a result of good optical properties, a temperature dependence and wavelength dependence which is substantially identical to that of the liquid-crystal layer used for displaying information and is characterized by a comparatively simple and inexpensive production capability.

Surprisingly, it has now been found that this object can be achieved by providing the electro-optical systems according to the invention.

The invention consequently relates to electro-optical systems containing at least one addressable liquid-crystal layer and a device for compensating for the optical path difference d·Δn of the addressable liquid-crystal layers, characterized in that the compensating device is based on a liquid-crystalline polymer.

In the working temperature range the liquid-crystalline polymer may have a nematic, smectic and/or cholesteric and, in particular, a nematic and/or smectic phase.

The liquid-crystalline polymer preferably has a glass transition temperature $T_G$ of $>50°$ C. The ratio of the optical path difference of the compensation layer to that of the addressable liquid-crystal layer(s) is preferably:

$$0.5 \leq \frac{(d \cdot \Delta n)_{comp}}{(d \cdot \Delta n)_{LC}} \leq 1.5$$

and, in particular, $$0.8 \leq \frac{(d \cdot \Delta n)_{comp}}{(d \cdot \Delta n)_{LC}} \leq 1.2$$

As liquid-crystalline polymers, use is preferably made of side-chain polymers of the formula I:

   I in which
  P is a polymer main-chain unit,
  Sp is a bivalent spacer group, and
  B is an organic "rod-like" radical containing at least two six-membered groups, a "disc-like" or "board-like" radical.

Furthermore, as liquid-crystalline polymers, use is preferably made of elastomers which contain 3-dimensionally crosslinked monomer units of the formula II:

   II in which
  P is a polymer main-chain unit,

Sp is a bivalent spacer group,

B is an organic "rod-like" radical containing at least two six-membered groups, a "disc-like" or "board-like" radical, and V is a crosslinking unit between adjacent polymer chains.

B is preferably a radical of the formula III:

$$R^1-(A^1-Z^1)_n-A^2-Z^2-A^3- \qquad III$$

in which $R^1$ is F, CN or an unsubstituted alkyl radical or an alkyl radical substituted by at least one halogen atom containing, in all cases, 1–15 carbon atoms, in which one or more nonadjacent $CH_2$ groups may be replaced by oxygen and/or sulfur atoms and/or by —CO—, —O—CO—, —CO—O—, —O—CO—O—, —S—CO— and/or —CO—S— and/or —CH=CH— groups, $Z^1$ and $Z^2$ are, in each case independently of one another, —CO—O—, —O—CO—, —CH$_2$CH$_2$—, —CH$_2$—O—, —OCH$_2$—, —C≡C— or a single bond, $A^1$, $A^2$ and $A^3$ are, in each case independently of one another, a 1,4-phenylene group in which one or more CH groups may also be replaced by nitrogen, a 1,4-cyclohexylene group in which one or two nonadjacent $CH_2$ groups may also be replaced by oxygen and/or sulfur, a 1,4-cyclohexenylene group, a 1,4-bicyclo[2.2.2]octylene group, a 1,4-piperidinediyl group, a 2,6-naphthalenediyl group, a 2,6-decahydronaphthalenediyl group, a 2,6-(1,2,3,4-tetrahydro)naphthalenediyl group, it being possible for all these groups to be unsubstituted or monosubstituted or polysubstituted by halogen, nitrile and/or 1–4-carbon alkyl, and n is 0, 1, 2 or 3.

B is particularly preferably a radical of the formula III in which $R^1$, $Z^1$ and $Z^2$, $A^1$, $A^2$ and $A^3$, and n have the above-specified meaning, with the proviso that in the case where n=1, $A^1=A^2=A^3=$Phe, $Z^2=$OOC and $Z^1=$a single bond, $R^1$ is not OCH$_3$.

Sp is preferably an alkylene group containing 1–20 carbon atoms, in which one or more nonadjacent $CH_2$ groups may also be replaced by —O—, —S—, —CO—, —O—CO—, —S—CO—, —O—COO—, —CO—S—, —CO—O—, —CH-halogen, —CHCN—, —CH=CH— and —C≡C—. Particularly preferably, Sp has the meaning just specified, with the proviso that in the case where B=-Phe-COO-Phe-Phe-OCH$_3$, Sp is not —COO—(CH$_2$)$_2$—O—.

Electro-optical systems are furthermore preferred which are based on the ECB principle or on the principle of the twisted nematic cell, the twist angle β preferably being between π/4 and 3π.

The invention also relates to processes for producing a device for compensating for the optical path difference d·Δn of the addressable liquid-crystal layers, which device is based on a liquid-crystalline polymer according to the invention, characterized in that the liquid-crystalline polymer is axially oriented by applying an electrical or magnetic field or by mechanical stress above the glass transition temperature, and in that this orientation is frozen-in by cooling the liquid-crystalline polymer to temperatures which are less than the glass transition temperature.

The invention furthermore relates to the use of a liquid-crystalline polymer according to the invention in electro-optical systems for compensating for the optical path difference of the addressable liquid-crystal layers.

The electro-optical systems according to the invention contain at least one addressable liquid-crystal layer which, in accordance with the standard structure, is situated in all cases between two plane-parallel carrier plates which, together with a frame, form a cell. Disposed on the insides of the carrier plates are electrode layers with orienting layers situated above them. Here the term "standard structure" is interpreted widely and also includes all alterations and modifications. The use of one or two addressable liquid-crystal layers, in particular, however, of only one addressable liquid-crystal layer, is preferred.

To compensate for the optical path difference d·Δn of the addressable liquid-crystal layer(s), a device based on a liquid-crystalline polymer, in general a thin film, is disposed parallel to said layer (or layers). In principle, two different types of liquid-crystalline polymers can be distinguished. Whereas the mesogenic monomers are attached to the polymeric main chain of the macro molecule—usually via a flexible intermediate section (spacer)—in the case of the side-chain polymers, in the case of main-chain polymers, the mesogenic monomers are possibly linked to more or less rigid main chains via flexible spacers, angled or offset monomers or other intermediate groups. In both cases, the polymer main chains may, in addition, be crosslinked three-dimensionally, which produces liquid-crystalline elastomers.

Liquid-crystalline polymers may be characterized by numerous phase-transition temperatures, which are normally observed in a DSC (Differential Scanning Calorimetry) or DTA (Differential Thermal Analysis) scan. Of great importance is the glass transition temperature, below which long-range bonds are frozen-in and the liquid-crystalline polymer is transformed into an amorphous glass. If liquid-crystalline polymers, in particular, however, side-chain polymers and elastomers, are heated to temperatures above the glass transition temperature $T_G$, they can be axially aligned by the action of a mechanical stress and/or of an electrical and/or magnetic field. If the polymer is then cooled with the field switched on or with the mechanical stress maintained, the orientation remains intact and uniaxial or even biaxial polymers (F. Hessel and H. Finkelmann, Polym. Bull. 15 (1986) 349; F. Hessel, R. P. Herr and H. Finkelmann, Makromol. Chem 188 (1987) 1597) are obtained. The precise experimental procedure in determining the glass transition temperature by means of DSC or DTA is described, for example, in P. D. Jam, O. Menis, ICTA Certificate, distributed by the US NBS as GM-754.

The liquid-crystal polymers are, in general, disposed in the form of a thin film on a carrier plate which forms the boundary of the addressable liquid-crystal layers. A further carrier plate is possibly disposed above the film as mechanical protection. If a plurality of addressable liquid-crystal layers is used, the compensating film may also be located between carrier plates associated with two different layers, and it may also bond them to one another. The film may be axially aligned before or after the carrier plate is put on. Owing to the long-range ordering below the glass transition temperature $T_G$, liquid-crystalline polymers frequently have a large optical anisotropy Δn, with the result that thin films can be used to compensate for the optical path difference, as a result of which the transparency of the optical system is increased.

Since the optical anisotropy changes abruptly at the glass transition, the working range of liquid-crystalline polymeric compensating films is generally limited to $T < T_G$. Preferably, liquid-crystalline polymers are used whose glass transition temperature $T_G$ is 50° C. or more.

As liquid-crystalline polymers, use is preferably made of side-chain polymers of the formula I:

   I in which Sp and B have the above-specified meaning.

As liquid-crystalline polymers, use is furthermore preferably made of elastomers which contain three-dimensionally crosslinked monomer units of the formula II:

   II in which P, Sp, B and V have the above-specified meaning.

Liquid-crystalline side-chain polymers and elastomers are prepared by polymerization processes which are known per se, as described in the literature (for example in the standard works such as Ocian, Principles of Polymerization, McGraw-Hill, N.Y.), and specifically under reaction conditions which are known and suitable for the reactions. In this connection, use may also be made of variants which are known per se and not mentioned here in more detail.

In the case of the liquid-crystalline side-chain polymers, it is possible, on the one hand, to polymerize monomers or monomers and comonomers which already carry mesogenic groups, it being possible in this connection furthermore to distinguish between chain-growth reactions (for example, free radical or ionic polymerization) and step-growth reactions (for example, polycondensation or polyaddition). On the other hand, the mesogenic groups may be attached subsequently with the aid of a so-called polymer-analogous reaction to already existing polymer chains.

Liquid-crystalline elastomers may be obtained by a three-dimensional crosslinking either of liquid-crystalline main-chain polymers or also of liquid-crystalline side-chain polymers, the use of side-chain polymers, however, being preferred. In this connection, crosslinking agents whose molecules have two or more reactive points are, in general, added.

Elastomers may furthermore be prepared by polymerization of monomers and/or oligomers, these low-molecular-weight compounds containing more than two linkage points in the molecule. Particularly preferred are molecules containing two C—C-double bonds, but molecules which contain a C—C double bond and one or more hydroxyl groups and/or carbonyl groups and/or other groups capable of polymerization may also be used. Very particularly preferred are divinyl, diacryloyl and vinylacryloyl compounds. The use of low-molecular-weight compounds not containing a C—C double bond is also furthermore preferred.

The low-molecular-weight compounds are preferably liquid-crystalline and/or preferably already carry mesogenic groups. However, it is also possible to attach the mesogenic groups to the polymer after synthesizing the elastomer by polymer-analogous reactions (for example, grafting reactions, cf. DE 3,817,088, 3,811,334).

The synthesis of the elastomer from low-molecular-weight compounds frequently has the advantage, in particular, that the optical anisotropy $\Delta n$, in particular, can be varied in a simple manner within a certain range by varying the synthesis temperature such as, for example, the polymerization temperature, and this appreciably simplifies matching the optical path differences of compensating film and liquid crystal.

Liquid-crystalline side-chain polymers and liquid-crystalline elastomers are preferably prepared by processes such as those described in DE 3,817,088, DE 3,811,334 and DE 3,621,581.

All those polymers whose chains have a certain flexibility are in principle suitable as the polymeric backbone —(—P—)—. These may be linear, branched or cyclic polymer chains. The degree of polymerization is normally at least 10, preferably 20-100. However, oligomers containing 3 to 15, in particular containing 4 to 7, monomer units are also suitable.

Preferably, polymers containing C—C main chains, in particular polyacrylates, polymethacrylates, poly-α-haloacrylates, poly-α-cyanoacrylates, polyacrylamides, poly-acrylonitriles or polymethylene malonates are used. Polymers containing hetero atoms in the main chain, for example polyethers, polyesters, polyamides, polyimides or polyurethanes or, in particular, polysiloxanes, are also furthermore preferred. In the case of -Sp-B= -COO-(CH$_2$)$_2$-O-Phe-COO-Phe-Phe-OCH$_3$, methacrylate is less preferred, in general, as the polymeric backbone.

Linear or branched alkylene groups containing 1-20 carbon atoms in which one or more nonadjacent CH$_2$ groups may also be replaced by —O—, —S—, —CO—, —O—CO—, —S—CO—, —O—COO—, —CO—S—, —CO—O—, —CH-halogen, —CHCN—, —CH=CH— and —C≡C— are especially suitable as spacers.

The following groups are, for example, suitable as spacers: ethylene, propylene, butylene, pentylene, hexlene (sic), octylene, decylene, undecylene, dodecylene, octadecylene, ethyleneoxyethylene, methyleneoxybutylene, ethylenethioethylene, ethylene-N-methyliminoethylene or 1-methylalkylene.

As examples of crosslinking agents, mention may be made of sulfur, hexamethylenetetramine, paraformaldehyde, zinc oxide, styrene, divinylbenzene, dialkyl alcohol, amines, fatty acid amides, oligoalkenes, oligosulfides and diisocyanates, these examples being intended, just like those cited for Sp and P, only to illustrate the invention, but without restricting it.

Preferred are "disc-like" mesogenic groups and, in particular, discotic groups as radical B. If the flexibility of the spacers is adequate, these groups often order themselves spontaneously, i.e. without exposure to an external field, parallel to one another above $T_G$. As examples, mention may be made of a number of discotic liquid-crystalline compounds, this enumeration being intended only to illustrate the invention without, however, restricting it:

(1) hexasubstituted benzene:

(2) 2, 3, 6, 7, 10, 11-hexasubstituted triphenyls:
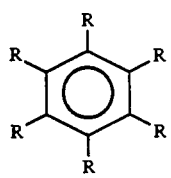
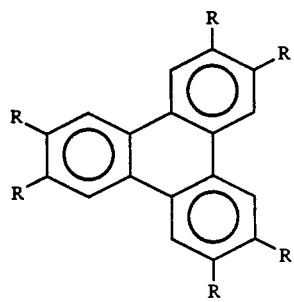
(3) 2, 3, 7, 8, 12, 13-hexasubstituted truxenes or their oxidized homologues:
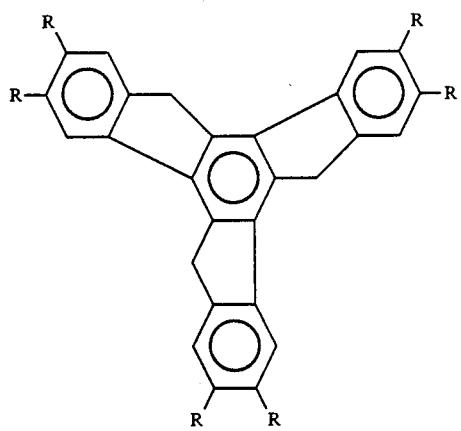
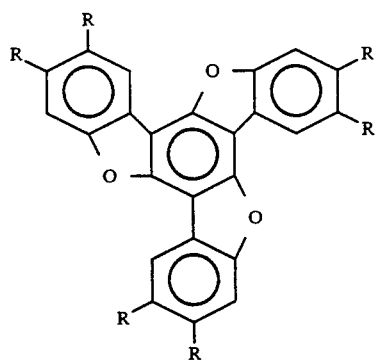
(4) 1, 2, 3, 5, 6, 7-hexasubstituted anthraquinones:
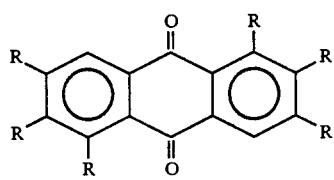
(5) substituted copper complexes:
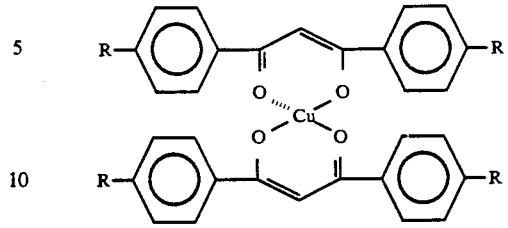
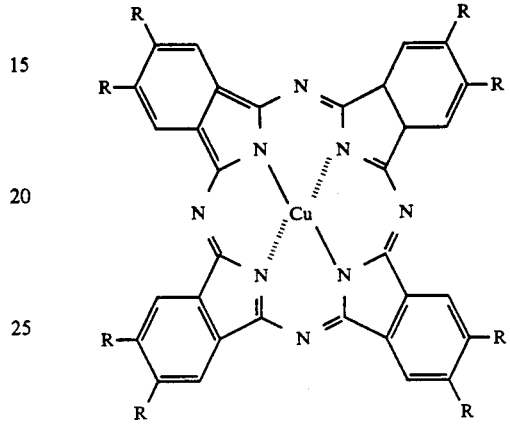
(6) tetraarylbipyranylidum:
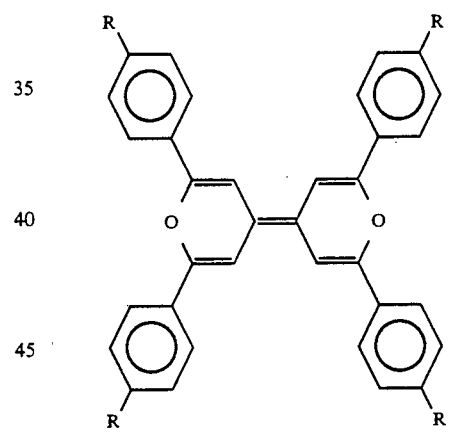
(7) porphyrin derivatives
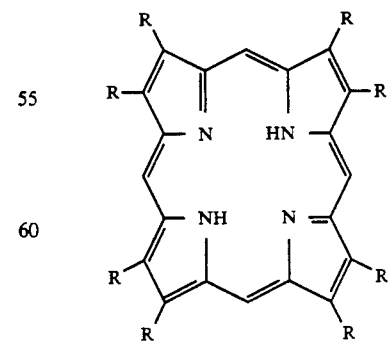
in which the R's, in each case independently of one another, are an aklkyl group containing up to 30 carbon atoms, in which one or more $CH_2$ groups may also be replaced by —O—, —CO—, —O—CO—, —CO—O—, —C≡C—, —CH=CH—, —O—, —O—COO, —O—O—COO—, two oxygen atoms not being directly linked to one another.

Preferred are the compounds (1), (2), (3) and (4); in particular, however, the compounds (1), (2) and (3). Particularly preferred are, furthermore, discotic liquid-crystal compounds in which at least one —CH$_2$— group is replaced by a 1,4-phenylene group in all the radicals R.

B furthermore preferably is a "rod-like" or a "board-like" mesogenic group.

As examples of rod-like mesogenic groups, nematic radicals may be cited which are bound by means of sufficiently flexible spacers to the polymer chain. The nematic radicals may then rotate around the long axis of the molecule and therefore have a cylindrical symmetry.

If, on the other hand, the rotation of the nematic radicals is virtually suppressed by a rigid spacer group, board-like mesogenic groups are obtained. However, other radicals having board-like geometry may also be used. In liquid-crystalline polymers containing board-like mesogenic groups, not only the long axes of the molecules may be disposed in parallel, but, in addition, an orienting long-range ordering with respect to the transverse axes is also possible. Such a liquid-crystalline polymer is described as biaxially nematic.

Particularly preferably, B is a radical of the formula III

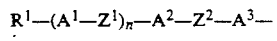

$$R^1—(A^1—Z^1)_n—A^2—Z^2—A^3—\qquad\text{III}$$

in which $R^1$, $R^2$, $A^1$, $A^2$, $A^3$, $Z^1$, $Z^2$ and n have the above-specified meaning.

The formula III includes dinuclear, trinuclear, quadrinuclear and pentanuclear radicals of the sub-formulae III 1–III 4:

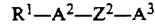

$$R^1—A^2—Z^2—A^3 \qquad\text{III 1}$$

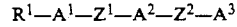

$$R^1—A^1—Z^1—A^2—Z^2—A^3 \qquad\text{III 2}$$

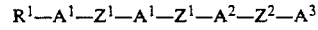

$$R^1—A^1—Z^1—A^1—Z^1—A^2—Z^2—A^3 \qquad\text{III 3}$$

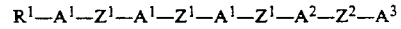

$$R^1—A^1—Z^1—A^1—Z^1—A^1—Z^1—A^2—Z^2—A^3 \qquad\text{III 4}$$

In the mesogenic radicals of the formula III, $R^1$ preferably is an unsubstituted alkyl or alkenyl radical or an alkyl or alkenyl radical substituted by at least one halogen atom, in which one or two nonadjacent CH$_2$ groups of these radicals may be replaced by oxygen atoms and/or by —O—CO—, —CO—O— and/or —O—CO—O— groups.

Halogen is preferably F or Cl.

Furthermore, those mesogenic radicals of the formula III are preferred in which $R^1$ is CN, F or Cl.

If $R^1$ is an alkyl radical or alkoxy radical, it may be straight-chain or branched. Preferably, it is straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy or octoxy, and furthermore methyl, nonyl, decyl, undecyl, dodecyl, tridecyl, tetradecyl, pentadecyl, methoxy, nonoxy, decoxy, undecoxy, dodecoxy, tridecoxy or tetradecoxy.

Oxaalkyl is preferably straight-chain 2-oxapropyl (=methoxymethyl), 2-oxabutyl (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7-or 8 -oxanonyl, 2-, 3-, 4-, 5-, 6-, 7-, 8- or 9-oxadecyl.

If $R^1$ is an alkenyl radical, it may be straight-chain or branched. Preferably it is straight-chain and has 2 to 10 carbon atoms. It accordingly is, in particular, vinyl, 1-propenyl or 2-propenyl, 1-butenyl, 2-butenyl or 3-butenyl, 1-, 2-, 3- or 4-pentenyl, 1-, 2-, 3-, 4- or 5-hexenyl, 1-, 2-, 3-, 4-, 5- or 6-heptenyl, 1-, 2-, 3-, 4-, 5-, 6- or 7-octenyl, 1-, 2-, 3-, 4-, 5-, 6-, 7- or 8-nonenyl, 1-, 2-, 3-, 4-, 5-, 6-, 7-, 8- or 9-decenyl.

Mesogenic radicals of the formula III containing branched wing groups $R^1$ may occasionally be of significance as comonomers, for example, owing to a reduction in the tendency to crystallization or for producing a twisted structure of the liquid-crystalline polymer. Branched groups of this type contain, as a rule, not more than one chain branch. Preferred branched radicals $R^1$ are isopropyl, 2-butyl (=1-methylpropyl), isobutyl (=2-methylpropyl), 2-methylbutyl, isopentyl (=3methylbutyl), 2-methylpentyl, 3-methylpentyl, 2-ethylhexyl, 2-propylpentyl, 2-octyl, isopropoxy, 2-methylpropoxy, 2-methylbutoxy, 3-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methyloctoxy, 6-methyloctanoyloxy, 5-methylheptyloxycarbonyl, 2-methylbutyryloxy, 3-methylvaleryloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl.

Binuclear, trinuclear and quadrinuclear mesogenic radicals are preferred. Those radicals are furthermore preferred which contain not more than one 1,4-bicyclo[2.2.2]octylene group, 1,4-piperidinediyl group or 2,6-(1,2,3,4-tetrahydro)naphthalenediyl group.

In pentanuclear mesogenic radicals, $Z^2$ is preferably a single bond or —CH$_2$CH$_2$—.

Of the mesogenic radicals of the formula III which contain a heterocyclic group, those containing a 2,5-pyridinediyl group, 2,5-pyridazinediyl group, 2,5-pyrimidinediyl group or 1,4-piperidinediyl group are particularly preferred.

A rather small group of particularly preferred mesogenic radicals of the formula III 1, III 2 and III 3 is cited below. In this connection, for the sake of simplicity, Cyc is a 1,4-cyclohexylene group, Dio is a 2,5-dioxanediyl group, Cy is a 1,4-cyclohexylene group in which one or two nonadjacent CH$_2$ groups may also be replaced by —O—, Phe is a 1,4-phenylene group in which one or more CH-groups may also be replaced by nitrogen, PheX is a 1,4-phenylene group which is monosubstituted or disubstituted by F, Cl and/or CH$_3$, Bi is a 1,4-bicyclo[2.2.2]octyl group, Pip is a 1,4-piperidinediyl group and Nap is a 2,6-deca-, 2,6-tetrahydronaphthalenediyl or 2,6-naphthalenediyl group.

Particularly preferred mesogenic radicals of the sub-formulae III 1 are those of the subformulae III 1-1 to III 1-8:

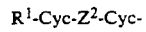

$R^1$-Cyc-$Z^2$-Cyc-     III 1-1

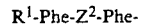

$R^1$-Phe-$Z^2$-Phe-     III 1-2

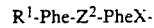

$R^1$-Phe-$Z^2$-PheX-     III 1-3

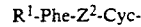

$R^1$-Phe-$Z^2$-Cyc-     III 1-4

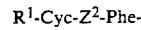

$R^1$-Cyc-$Z^2$-Phe-     III 1-5

| | |
|---|---|
| $R^1$-Phe-$Z^2$-PheX- | III 1-6 |
| $R^1$-Cyc-$Z^2$-PheX- | III 1-7 |
| $R^1$-PheX-$Z^2$-Phe- | III 1-8 |

In the compounds of the subformulae III 1-1 to III 1-8, $R^1$ is, with very particular preference, an alkyl or alkenyl group, and furthermore alkoxy or alkanoyloxy, containing 1-13 carbon atoms in all cases. Furthermore, in these compounds $Z^2$ is, with very particular preference, an ester group C (—CO—O— or —O—CO—), —CH$_2$CH$_2$— or a single bond.

Particularly preferred mesogenic radicals of the subformulae III 2 are those of the subformulae III 2-1 to III 2-16:

| | |
|---|---|
| $R^1$-Phe-$Z^1$-Phe-$Z^2$-Phe- | III 2-1 |
| $R^1$-PheX-$Z^1$-Phe-$Z^2$-Phe- | III 2-2 |
| $R^1$-Phe-$Z^1$-Phe-$Z^2$-PheX- | III 2-3 |
| $R^1$-Cyc-$Z^1$-Cyc-$Z^2$-Cyc- | III 2-4 |
| $R^1$-Cyc-$Z^1$-Phe-$Z^2$-Phe- | III 2-5 |
| $R^1$-Cyc-$Z^1$-Cyc-$Z^2$-Phe- | III 2-6 |
| $R^1$-Cyc-$Z^1$-Cyc-$Z^2$-Dio- | III 2-7 |
| $R^1$-Cyc-$Z^1$-Phe-$Z^2$-PheX- | III 2-8 |
| $R^1$-Cyc-$Z^1$-Cyc-$Z^2$-PheX- | III 2-9 |
| $R^1$-Bi-Cyc-$Z^2$-Cyc- | III 2-10 |
| $R^1$-Nap-$Z^1$-Cyc-$Z^2$-Phe- | III 2-11 |
| $R^1$-Cy-$Z^1$-Phe-$Z^2$-Phe- | III 2-12 |
| $R^1$-Dio-$Z^1$-Cyc-$Z^2$-Cyc- | III 2-13 |
| $R^1$-Phe-$Z^1$-Cyc-$Z^2$-Cyc- | III 2-14 |
| $R^1$-Cyc-$Z^1$-Phe-$Z^2$-Cyc | III 2-15 |
| $R^1$-Cyc-$Z^1$-PheX-$Z^2$-Cyc | III 2-16 |

Of the compounds of the subformulae III 2-1 to III 2-16 which contain a 1,4-phenylene group in which one or two CH$_2$ groups are replaced by nitrogen, those containing a 2,5-pyridinediyl group or 2,5-pyrimidinediyl group are very particularly preferred.

Particularly preferred mesogenic radicals of the subformulae III 3 are those of the subformulae III 3-1 to III 3-19:

| | |
|---|---|
| $R^1$-Phe-$Z^1$-Phe-$Z^1$-Phe-$Z^2$-Phe- | III 3-1 |
| $R^1$-Cyc-$Z^1$-Cyc-$Z^1$-Cyc-$Z^2$-Cyc- | III 3-2 |
| $R^1$-Cyc-$Z^1$-Phe-$Z^1$-Phe-$Z^2$-Phe- | III 3-3 |
| $R^1$-Cyc-$Z^1$-Cyc-$Z^1$-Phe-$Z^2$-Phe- | III 3-4 |
| $R^1$-Cyc-$Z^1$-Cyc-$Z^1$-Cyc-$Z^2$-Phe- | III 3-5 |
| $R^1$-Cyc-$Z^1$-Phe-$Z^1$-Phe-Cyc- | III 3-6 |
| $R^1$-Cyc-$Z^1$-Cyc-$Z^1$-Phe-Cyc- | III 3-7 |
| $R^1$-Cyc-$Z^1$-Phe-$Z^1$-Cyc-$Z^2$-Cyc- | III 3-8 |
| $R^1$-Phe-$Z^1$-Cyc-$Z^1$-Cyc-$Z^2$-Cyc- | III 3-9 |
| $R^1$-Phe-$Z^1$-Phe-$Z^1$-Cyc-$Z^2$-Cyc | III 3-10 |
| $R^1$-Phe-$Z^1$-Phe-$Z^1$-Phe-$Z^2$-PheX- | III 3-11 |
| $R^1$-Cyc-$Z^1$-Cyc-$Z^1$-PheX-$Z^2$-Phe- | III 3-12 |
| $R^1$-Cyc-$Z^1$-Cyc-$Z^1$-Phe-$Z^2$-PheX- | III 3-13 |
| $R^1$-Cyc-$Z^1$-PheX-$Z^1$-Phe-$Z^2$-Cyc- | III 3-14 |
| $R^1$-Cyc-$Z^1$-Phe-$Z^1$-PheX-$Z^2$-Cyc- | III 3-15 |
| $R^1$-PheX-$Z^1$-Phe-$Z^1$-Cyc-$Z^2$-Cyc- | III 3-16 |
| $R^1$-Dio-$Z^1$-Cyc-$Z^1$-Cyc-$Z^2$-Cyc- | III 3-17 |
| $R^1$-Cyc-$Z^1$-Cyc-$Z^1$-Cy-$Z^2$-Phe- | III 3-18 |
| $R^1$-Cyc-$Z^1$-Pip-$Z^1$-Phe-$Z^2$-Phe- | III 3-19 |

In the compounds of the subformulae III 3-1 to III 3-19, at least one of the two $Z^1$ groups or $Z^2$ is, with very particular preference, a single bond.

The addressable liquid-crystal layers of the electro-optical systems are preferably based on the ECB principle which was first described in 1971 (M. F. Schieckel and K. Fahrenschon, "Deformation of nematic liquid crystals with vertical orientation in electrical fields", Appl. Phys. Lett. 19 (1971), 3912). There followed publications by J. F. Kahn (Appl. Phys. Lett. 20 (1972), 1193), G. Labrunie and J. Robert (J. Appl. Phys. 44 (1973), 4869) and S. Matsumoto, M. Kawamoto and K. Mizunoya (J. Appl. Phys. 47 (1976), 3842).

In these electro-optical systems, the nematic liquid crystal used in the addressable liquid-crystal layer(s) has a negative dielectric anisotropy $\Delta\epsilon$, with the result that the liquid-crystal molecule is converted from the homeotropic orientation into a tilted planar one on applying a voltage.

Furthermore, the addressable liquid-crystal layer(s) of the electro-optical systems according to the invention is (are) preferably based on the principle of the twisted nematic cell. In this connection, the term "twisted nematic cell" is widely interpreted here and includes both standard TN cells having a twist angle of about $\pi/4$ (M. Schadt and W. Helfrich, Appl. Phys. Lett. 18 (1971) 127) and also more highly twisted cells having twist angles which are between $\pi/4$ and $3\pi$. Such more highly twisted cells are disclosed, for example, in EP 0,131,216 B1, DE 3,423,993 A1, EP 0,098,070 A2, M. Schadt and F. Leenhouts, 17th Working Conference on Liquid Crystals, Freiburg (Apr. 8–10, 1987), K. Kawasaki et al., SID 87 Digest 391 (20.6), M. Schadt and F. Leenhouts, SID 87 Digest 372 (20.1), K. Katoh et al., Japanese Journal of Applied Physics, Vol. 26, No. 11, L 1784-L 1786 (1987), F. Leenhouts et al., Appl. Phys. Lett. 50 (21), 1468 (1987), H. A. van Sprang and H. G. Koopman, J. Appl. Phys. 62 (5), 1734 (1987), T. J. Scheffer and J. Nehring, Appl. Phys. Lett. 45 (10), 1021 (1984), M. Schadt and F. Leenhouts, Appl. Phys. Lett. 50 (5), 236 (1987), E. P. Raynes, Mol. Cryst. Liq. Cryst. Letters, Vol. 4 (1), pages 1–8 (1986), C. M. Waters et al., Proc. Soc. Inf. Disp. (New York) (1985) (3rd Intern. Display Conference, Kobe, Japan), German Offenlegungsschrift 3,503,259, T. J. Scheffer and J.

Nehring, Appl. Phys. Lett. 45 (1984), 1021, M. Schadt and F. Leenhouts, Appl. Phys. Lett. 50 (1987), 236.

Liquid-crystalline polymers can be axially aligned by exposing the polymer to an electrical and/or magnetic field or a mechanical stress above the glass transition temperature, and this results in an alignment of the mesogenic groups. The orientation induced in this way can be frozen-in by cooling the polymer while maintaining the mechanical stress or with the field switched on below the glass transition temperature. The orientation then remains stable even after switching off the field or the mechanical stress. Thus, for example, Shibaev et al. describe the dipolar alignment of a liquid-crystalline side-chain polymer in an electrical alternating field above the glass transition temperature (V. P. Shibaev et al., Polymer Communications 24 (1983), 364). Schätzle et al. state that a liquid-crystalline elastomer film can be axially oriented above the glass transition temperature by applying a tensile stress (J. Schätzle and H. Finkelmann, Mol. Cryst. Liq. Cryst. 142 (1987), 86). The processes cited here for orienting liquid-crystalline polymer compensating films are intended to illustrate the invention, however, only by way of example and not to restrict it in any way.

The specific form of the compensating film according to the invention, i.e., the choice of the polymer type, the mesogenic group and the type of alignment, may be varied and optimized with regard to the particular application. If the addressable liquid-crystal layers are, for example, TN or STN cells in which the liquid-crystal molecules are twisted in the unaddressed state and are disposed more or less perpendicularly to the substrates in the addressed state, a distinction should be made between whether the optical path difference is to be compensated for primarily in the switched-off or in the switched-on state by the compensating film.

If the optical path difference is to be compensated for optimally, in particular in the switched-off state, the compensating film is preferably based on side-chain polymers or elastomers having mesogenic groups of the formula III which have an nematic, smectic or cholesteric phase and, in particular, a nematic or smectic phase. The compensating film is so aligned and so disposed, for example, on the upper substrate of the addressable liquid-crystal layer(s) that the optical axes of compensating film and liquid-crystal layer are perpendicular to one another in the unaddressed state. However, it is also, for example, possible that the liquid-crystalline compensating layer has a cholesteric structure in which the direction of rotation of the helix in the liquid-crystal layer is opposite to that of the helix in the compensating layer and the molecules of the liquid-crystal layer and the mesogenic groups of the compensating layer are essentially perpendicular to one another at the common substrate.

If, on the other hand, the path difference is to be compensated for, in particular, in the switched-on state, for example, to ensure a low dependence of the contrast on viewing angle in the switched-on state, the compensating layer is based, in particular, on side-chain polymers or elastomers which contain, in particular, discotic mesogenic groups, these disc-like mesogenic groups being disposed essentially parallel to the substrate surfaces, i.e., perpendicular to the electrical field applied.

The person skilled in the art can at any time carry out such an optimization and adaptation of the compensating films according to the invention in regard to the particular objective within the scope of the present disclosure without further inventive assistance.

The devices used in the electro-optical segments according to the invention for compensating for the optical path difference $d \cdot \Delta n$ of the addressable liquid-crystal layers are markedly superior to conventional devices.

EXAMPLES

The following examples are intended to illustrate the invention without restricting it. The specified spacer lengths denote the number n of the spacer $(CH_2)_n$. The monomer ratios are given in mol %.

Example 1

Elastomer used:

| | | Monomer ratio |
|---|---|---|
| Polymer backbone: | Polymethacrylate | |
| Mesogenic group: | 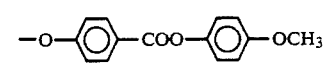 | 93 |
| Comonomer: | 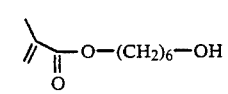 | 4.5 |
| Spacer length: | 6 | |
| Crosslinking agent: | 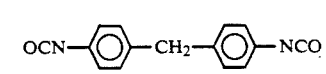 | 2.5 |
| Glass transition temperature: | 65° C., clearing point: 101° C. | |

A film having a thickness of 50 μm is prepared from the crosslinked polymer in accordance with J. Schätzle and H. Finkelmann, Mol. Cryst. Liq. Cryst. 142 (1987), 85; the film is then heated to a temperature of 80° C. and uniaxially stretched. The macroscopic orientation is frozen-in by cooling to room temperature under mechanical stress, which is evident from the strong birefringence of the film. The birefringence is determined with a Soleil-Babinet compensator (L.R.G. Treloar, "The Physics of Rubber Elasticity", Clavendon Press, Oxford, 1975).

The film exhibits a birefringence of 0.12 at a wavelength of 632 nm.

Example 2

Elastomer used:

| | | Monomer ratio |
|---|---|---|
| Polymer backbone: | Polymethacrylate | |
| Mesogenic group: |  | 93 |
| Comonomer: | 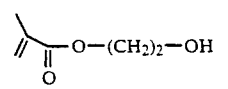 | 5 |

| | Monomer ratio |
|---|---|
| Spacer length: | 2 |
| Crosslinking agent: 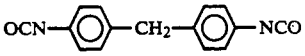 | 2 |
| Glass transition temperature: | 45° C., clearing point: 120° C. |

A film having a thickness of 50 μm is prepared from this polymer. The film is then pressed by means of two oppositely rotating rolls; this yields a film having a thickness of 7 μm.

Uniaxial stretching of a film at 60° C. and then cooling under mechanical stress yields a transparent, uniaxially stretched film having an optical delay of 0.88. The dispersion of the index of refraction of the film is equivalent to that of a typical liquid-crystal mixture for STN applications such as ZLI-2293 (E. MERCK, Darmstadt).

The use of the films according to the invention instead of commercially obtainable films (for example, of the firms Sumitomo Chemicals and Nitto Denko) yields electro-optical systems with improved transmission.

We claim:

1. In an electro-optical system comprising at least one addressable liquid-crystal layer and means for compensating for the optical path difference d·Δn of said at least one addressable liquid-crystal layer, the improvement wherein said compensating means comprises:

a liquid-crystalline side-chain polymer containing monomer units of formula I:

  (I)

wherein

P is a polymer main-chain unit,

Sp is a bivalent spacer group connecting radical B to polymer main chain, and

B is an organic "rod-like" radical containing at least two six-membered groups, a "disc-like" radical or a "board-like" radical; or a liquid crystal elastomer containing 3-dimensionally crosslinked monomer units of formula II:

  (II)

wherein

P, Sp and B are as defined above, and

V is a crosslinking unit linking together two adjacent polymer chains.

2. An electro-optical system according to claim 1, wherein said liquid-crystalline side-chain polymer or liquid crystal elastomer has a glass transition temperature $T_G$ of at least 50° C.

3. An electro-optical system according to claim 1, wherein said compensating means comprises said liquid-crystalline side-chain polymer.

4. An electro-optical system according to claim 1, wherein said compensating means comprises said liquid-crystalline elastomer.

5. An electro-optical system according to claim 3, wherein B is a radical of the formula III:

$$R^1-(A^1-Z^1)_n-A^2-Z^2-A^3-$$  III in which $R^1$ is F, CN or an unsubstituted alkyl radical or an alkyl radical substituted by at least one halogen atom containing, in all cases, 1–15 carbon atoms, in which one or more nonadjacent $CH_2$ groups may be replaced by oxygen and/or sulfur atoms and/or by —CO—, —O—CO—, —CO—O—, —O—CO—O—, —S—CO— and/or —CO—S— and/or —CH=CH— groups;

$Z^1$ and $Z^2$ are, in each case independently of one another, —CO—O—, —O—CO—, —$CH_2CH_2$—, —$CH_2$—O—, —$OCH_2$—, —C≡C— or a single bond;

$A^1$, $A^2$ and $A^3$ are, in each case independently of one another, a 1,4-phenylene group in which one or more CH groups may also be replaced by nitrogen, a 1,4-cyclohexylene group in which one or two non-adjacent $CH_2$ groups may also be replaced by oxygen and/or sulfur, a 1,4-cyclohexenylene group, a 1,4-bicyclo[2.2.2]octylene group, a 1,4-piperidinediyl group, a 2,6-naphthalenediyl group, a 2,6-decahydronaphthalenediyl group, a 2,6-(1,2,3,4-tetrahydro)naphthalenediyl group, in each case being unsubstituted or monosubstituted or polysubstituted by halogen, nitrile and/or 1-4-carbon alkyl; and n is 0, 1, 2 or 3.

6. An electro-optical system according to claim 3, wherein Sp is an alkylene group containing 1–20 carbon atoms, in which one or more nonadjacent $CH_2$ groups can each be replaced by —O—, —S—, —CO—, —O—CO—, —S—CO—, —O—COO—, —CO—S—, —CO—O—, —CH-halogen, —CHCN—, —CH=CH— or —C≡C—.

7. An electro-optical system according to claim 1, wherein said addressable liquid crystal layer is within an ECB cell.

8. An electro-optical system according to claim 1, wherein said addressable liquid-crystal layer is within a twisted nematic cell.

9. An electro-optical system according to claim 8, wherein the twist angle β is between π/4 and 3π.

10. An electro-optical system according to claim 1, wherein said compensating means is a layer of liquid-crystalline polymers and the ratio of optical path difference of said compensating means to that of said at least one addressable liquid-crystal layer is:

$$0.5 \leq \frac{(d \cdot \Delta n)_{comp}}{(d \cdot \Delta n)_{LC}} \leq 1.5$$

11. An electro-optical system according to claim 1, wherein said compensating means is a layer of liquid-crystalline polymers and the ratio of optical path difference of said compensating means to that of said at least one addressable liquid-crystal layer is:

$$0.8 \leq \frac{(d \cdot \Delta n)_{comp}}{(d \cdot \Delta n)_{LC}} \leq 1.2$$

12. An electro-optical system according to claim 5, wherein $R^1$ is not $OCH_3$ if:
n is 1,
$A^1$, $A^2$ and $A^3$ are each 1,4-phenylene,
$Z^2$ is —OOC—, and
$Z^1$ is a single bond.

13. An electro-optical system according to claim 4, wherein B is a radical of the formula III:

$$R^1-(A^1-Z^1)_n-A^2-Z^2-A^3- \quad \text{III}$$

in which
$R^1$ is F, CN or an unsubstituted alkyl radical or an alkyl radical substituted by at least one halogen atom containing, in all cases, 1-15 carbon atoms, in which one or more nonadjacent $CH_2$ groups may be replaced by oxygen and/or sulfur atoms and/or by —CO—, —O—CO—, —CO—O—, —O—CO—O—, —S—CO— and/or —CO—S— and/or —CH=CH— groups;
$Z^1$ and $Z^2$ are, in each case independently of one another, —CO—O—, —O—CO—, —$CH_2CH_2$—, —$CH_2$—O—, —O$CH_2$—, —C≡C— or a single bond;
$A^1$, $A^2$ and $A^3$ are, in each case independently of one another, a 1,4-phenylene group in which one or more CH groups may also be replaced by nitrogen, a 1,4-cyclohexylene group in which one or two non-adjacent $CH_2$ groups may also be replaced by oxygen and/or sulfur, a 1,4-cyclohexenylene group, a 1,4-bicyclo[2.2.2]octylene group, a 1,4-piperidinediyl group, a 2,6-naphthalenediyl group, a 2,6-decahydronaphthalenediyl group, a 2,6-(1,2,3,4-tetrahydro)naphthalenediyl group, in each case being unsubstituted or monosubstituted or polysubstituted by halogen, nitrile and/or 1-4-carbon alkyl; and
n 0, 1, 2 or 3.

14. An electro-optical system according to claim 4, wherein Sp is an alkylene group containing 1-20 carbon atoms, in which one or more nonadjacent $CH_2$ groups can each be replaced by —O—, —S—, —CO—, —O—CO—, —S—CO—, —O—COO—, —CO—S—, —CO—O—, —CH-halogen, —CHCN—, —CH=CH— or —C≡C—.

15. An electro-optical system according to claim 6, wherein Sp is not —COO—$(CH_2)_2$—O— if B is -Phe-COO-Phe-Phe-$OCH_3$ wherein Phe is 1,4-phenylene.

16. An electro-optical system according to claim 14, wherein So is not —COO—$(CH_2)_2$—O— if B is -Phe-COO-Phe-Phe-$OCH_3$ wherein Phe is 1,4-phenylene.

17. An electro-optical system according to claim 3, wherein the main chain of said liquid crystalline side-chain polymer or elastomer is selected from the group consisting of polyacrylates, polymethacrylates, poly-α-haloacrylates, poly-α-cyanoacrylates, polyacrylamides, polyacrylonitriles, polymethylene malonates, polyethers, polyesters, polyamides, polyimides, polyurethanes and polysiloxanes.

18. An electro-optical system according to claim 4, wherein the main chain of said liquid crystalline side-chain polymer or elastomer is selected from the group consisting of polyacrylates, polymethacrylates, poly-α-haloacrylates, poly-α-cyanoacrylates, polyacrylamides, polyacrylonitriles, polymethylene malonates, polyethers, polyesters, polyamides, polyimides, polyurethanes and polysiloxanes.

19. A electro-optical system according to claim 4, wherein said cross-linking unit is formed from sulfur, hexamethylenetetramine, paraformaldehyde, zinc oxide, styrene, divinylbenzene, a dialkyl alcohol, an amine, a fatty acid amide, an oligoalkene, an oligosulfide or a diisocyanate.

20. An electro-optical system according to claim 5, wherein B is a radical according to subformula III 1-1 to III 1-8

| | |
|---|---|
| $R^1$-Cyc-$Z^2$-Cyc- | III 1-1 |
| $R^1$-Phe-$Z^2$-Phe- | III 1-2 |
| $R^1$-Phe-$Z^2$-PheX- | III 1-3 |
| $R^1$-Phe-$Z^2$-Cyc- | III 1-4 |
| $R^1$-Cyc-$Z^2$-Phe- | III 1-5 |
| $R^1$-Phe-$Z^2$-PheX- | III 1-6 |
| $R^1$-Cyc-$Z^2$-PheX- | III 1-7 |
| $R^1$-PheX-$Z^2$-Phe- | III 1-8 | wherein Cyc is a 1,4-cyclohexylene group, Phe is a 1,4-phenylene group in which one or more CH-groups can each be replaced by N, and PheX is a 1,4-phenylene which is monosubstituted or disubstituted by F, Cl and/or $CH_3$.

21. An electro-optical system according to claim 5, wherein B is a radical according to subformula III 2-1 to III 2-16

| | |
|---|---|
| $R^1$-Phe-$Z^1$-Phe-$Z^2$-Phe- | III 2-1 |
| $R^1$-PheX-$Z^1$-Phe-$Z^2$-Phe- | III 2-2 |
| $R^1$-Phe-$Z^1$-Phe-$Z^2$-PheX | III 2-3 |
| $R^1$-Cyc-$Z^1$-Cyc-$Z^2$-Cyc- | III 2-4 |
| $R^1$-Cyc-$Z^1$-Phe-$Z^2$-Phe- | III 2-5 |
| $R^1$-Cyc-$Z^1$-Cyc-$Z^2$-Phe- | III 2-6 |
| $R^1$-Cyc-$Z^1$-Cyc-$Z^2$-Dio- | III 2-7 |
| $R^1$-Cyc-$Z^1$-Phe-$Z^2$-PheX- | III 2-8 |
| $R^1$-Cyc-$Z^1$-Cyc-$Z^2$-PheX- | III 2-9 |
| $R^1$-Bi-Cyc-$Z^2$-Cyc- | III 2-10 |
| $R^1$-Nap-$Z^1$-Cyc-$Z^2$-Phe- | III 2-11 |
| $R^1$-Cy-$Z^1$-Phe-$Z^2$-Phe- | III 2-12 |
| $R^1$-Dio-$Z^1$-Cyc-$Z^2$-Cyc- | III 2-13 |
| $R^1$-Phe-$Z^1$-Cyc-$Z^2$-Cyc- | III 2-14 |
| $R^1$-Cyc-$Z^1$-Phe-$Z^2$-Cyc | III 2-15 |
| $R^1$-Cyc-$Z^1$-PheX-$Z^2$-Cyc | III 2-16 | wherein Cyc is 1,4-cyclohexylene, Dio is 2,5-dioxanediyl, Cy is 1,4-cyclohexylene in which one or two nonadjacent CH₂ groups can each be replaced by —O—, Phe is 1,4-phenylene in which one or more CH-groups can each be replaced by N, PheX is 1,4-phenylene which is monosubstituted or disubstituted by F, Cl and/or CH₃, Bi is a 1,4-bicyclo[2.2.2]octyl group, Nap is 2,6-deca-or 2,6-tetrahydronaphthalenediyl or 2,6-naphthalenediyl.

22. An electro-optical system according to claim 5, wherein B is a radical according to subformula III 3-1 III 3-19

| | |
|---|---|
| R¹-Phe-Z¹-Phe-Z¹-Phe-Z²-Phe- | III 3-1 |
| R¹-Cyc-Z¹-Cyc-Z¹-Cyc-Z²-Cyc- | III 3-2 |
| R¹-Cyc-Z¹-Phe-Z¹-Phe-Z²-Phe- | III 3-3 |
| R¹-Cyc-Z¹-Cyc-Z¹-Phe-Z²-Phe- | III 3-4 |
| R¹-Cyc-Z¹-Cyc-Z¹-Cyc-Z²-Phe- | III 3-5 |
| R¹-Cyc-Z¹-Phe-Z¹-Phe-Cyc- | III 3-6 |
| R¹-Cyc-Z¹-Cyc-Z¹-Phe-Cyc- | III 3-7 |
| R¹-Cyc-Z¹-Phe-Z¹-Cyc-Z²-Cyc- | III 3-8 |
| R¹-Phe-Z¹-Cyc-Z¹-Cyc-Z²-Cyc- | III 3-9 |
| R¹-Phe-Z¹-Phe-Z¹-Cyc-Z²-Cyc- | III 3-10 |
| R¹-Phe-Z¹-Phe-Z¹-Phe-Z²-PheX- | III 3-11 |
| R¹-Cyc-Z¹-Cyc-Z¹-PheX-Z²-Phe- | III 3-12 |
| R¹-Cyc-Z¹-Cyc-Z¹-Phe-Z²-PheX- | III 3-13 |
| R¹-Cyc-Z¹-Phe-Z¹-PheX-Z²-Cyc- | III 3-14 |
| R¹-Cyc-Z¹-Phe-Z¹-PheX-Z²-Cyc- | III 3-15 |
| R¹-PheX-Z¹-Phe-Z¹-Cyc-Z²-Cyc- | III 3-16 |
| R¹-Dio-Z¹-Cyc-Z¹-Cyc-Z²-Cyc- | III 3-17 |
| R¹-Cyc-Z¹-Cyc-Z¹-Cy-Z²-Phe- | III 3-18 |
| R¹-Cyc-Z¹-Pip-Z¹-Phe-Z²-Phe- | III 3-19 | wherein Cyc is 1,4-cyclohexylene, Dio is 2,5-dioxanediyl, Cy is 1,4-cyclohexylene in which one or two nonadjacent CH₂ groups can each be replaced by —O—, Phe is 1,4-phenylene in which one or more CH-groups can each be replaced by N, PheX is 1,4-phenylene which is monosubstituted or disubstituted by F, Cl and/or CH₃, Pip is 1,4-piperidinediyl.

23. An electro-optical system according to claim 17, wherein Sp is an alkylene group containing 1–20 carbon atoms, in which one or more nonadjacent CH₂ groups can each be replaced by —O—, —S—, —CO—, —O—CO—, —S—CO—, —O—COO—, —CO—S—, —CO—O—, —CH-halogen, —CHCN—, —CH=CH— or —C≡C—.

24. An electro-optical system according to claim 18, wherein said cross-linking unit is formed from sulfur, hexamethylenetetramine, paraformaldehyde, zinc oxide, styrene, divinylbenzene, a dialkyl alcohol, an amine, a fatty acid amide, an oligoalkene, an oligosulfide or a diisocyanate.

25. An electro-optical system according to claim 24, wherein Sp is an alkylene group containing 1–20 carbon atoms, in which one or more nonadjacent CH₂ groups can each be replaced by —O—, —S—, —CO—, —O—CO—, —S—CO—, —O—COO—, —CO—S—, —CO—O—, —CH-halogen, —CHCN—, —CH=CH— or —C≡C—.

26. A process for producing a device for compensating for the optical path difference d·Δn of an addressable liquid-crystal layer, wherein said device is based on a liquid-crystalline polymer, comprising:

axially orienting a liquid-crystal polymer, by applying an electrical or magnetic field or by mechanical stress, above the glass transition temperature, and freezing-in this orientation by cooling said liquid-crystalline polymer to a temperature below said glass transition temperature, said liquid crystal polymer being a side-chain polymer containing monomer units of formula I:

wherein
P is a polymer main-chain unit,
Sp is a bivalent spacer group connecting radical B to polymer main chain, and
B is an organic "rod-like" radical containing at least two six-membered groups, a "disc-like" radical or a "board-like" radical; or a liquid crystal elastomer containing 3-dimensionally crosslinked monomer units of formula II:

wherein
P, Sp and B are as defined above, and
V is a crosslinking unit linking together two adjacent polymer chains.

27. In a method of compensating for the optical path difference of an addressable liquid-crystal layer, the improvement wherein a liquid-crystalline polymer is used as a means for compensating said optical path difference and said liquid-crystalline polymer is a side-chain polymer containing monomer units of formula I:

wherein
P is a polymer main-chain unit,
Sp is a bivalent spacer group connecting radical B to polymer main chain, and
B is an organic "rod-like" radical containing at least two six-membered groups, a "disc-like" radical or a "board-like" radical; or a liquid crystal elastomer containing 3-dimensionally crosslinked monomer units of formula II:

wherein
P, Sp and B are as defined above, and
V is a crosslinking unit linking together two adjacent polymer chains.

* * * * *